United States Patent
Sasaki et al.

(10) Patent No.: US 9,625,656 B2
(45) Date of Patent: Apr. 18, 2017

(54) MULTI-CORE OPTICAL FIBER AND METHOD FOR MANUFACTURING MULTI-CORE OPTICAL FIBER CONNECTOR

(71) Applicant: SUMITOMO ELECTRIC INDUSTRIES, LTD., Osaka-shi, Osaka (JP)

(72) Inventors: Takashi Sasaki, Yokohama (JP); Osamu Shimakawa, Yokohama (JP); Tetsuya Nakanishi, Yokohama (JP); Yasuomi Kaneuchi, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 14/758,335

(22) PCT Filed: Dec. 22, 2014

(86) PCT No.: PCT/JP2014/083953
§ 371 (c)(1),
(2) Date: Jun. 29, 2015

(87) PCT Pub. No.: WO2015/098863
PCT Pub. Date: Jul. 2, 2015

(65) Prior Publication Data
US 2016/0252683 A1    Sep. 1, 2016

(30) Foreign Application Priority Data

Dec. 25, 2013 (JP) ................. 2013-267444

(51) Int. Cl.
*G02B 6/02* (2006.01)
*G02B 6/38* (2006.01)
(Continued)

(52) U.S. Cl.
CPC ....... *G02B 6/3843* (2013.01); *G02B 6/02042* (2013.01); *G02B 6/245* (2013.01);
(Continued)

(58) Field of Classification Search
CPC .................................. G02B 6/02; G02B 6/38
(Continued)

(56) References Cited

U.S. PATENT DOCUMENTS 4,295,739 A * 10/1981 Meltz et al. ................. 374/161
4,709,155 A * 11/1987 Yamaguchi et al. .......... 250/554
(Continued)

FOREIGN PATENT DOCUMENTS

JP    S63-33102 U    3/1988
JP    2010-286548 A    12/2010
(Continued)

OTHER PUBLICATIONS

English-lanaguage translation of International Preliminary Report on Patentability (IPRP) dated Jul. 7, 0216 that issued in WO Patent Application No. PCT/JP2014/083953.

*Primary Examiner* — Kaveh C Kianni
(74) *Attorney, Agent, or Firm* — Drinker Biddle & Reath LLP

(57) ABSTRACT

The present invention relates to an MCF and others with a structure for accurately aligning each of core arrangement directions of one or more MCFs to be fixed in a connector. Each of the MCFs has a marker as an index for rotational position. The ends of the MCFs are rotated while monitoring positions of the respective markers with a CCD camera or the like, whereby each of the core arrangement directions is aligned with a specific direction.

11 Claims, 11 Drawing Sheets

(51) Int. Cl.
*G02B 6/245* (2006.01)
*G02B 6/36* (2006.01)

(52) U.S. Cl.
CPC ......... *G02B 6/3839* (2013.01); *G02B 6/3885* (2013.01); *G02B 6/3652* (2013.01)

(58) Field of Classification Search
USPC .......................................................... 385/3
See application file for complete search history.

(56) References Cited

U.S. PATENT DOCUMENTS

| | | | | |
|---|---|---|---|---|
| 4,787,702 | A * | 11/1988 | Khalil | 385/102 |
| 5,215,489 | A * | 6/1993 | Nakamura | 445/4 |
| 5,290,280 | A * | 3/1994 | Daikuzono | 606/16 |
| 5,454,057 | A * | 9/1995 | Arima et al. | 385/46 |
| 5,703,987 | A * | 12/1997 | Imoto | 385/126 |
| 5,944,867 | A * | 8/1999 | Chesnoy et al. | 65/408 |
| 6,031,850 | A * | 2/2000 | Cheo | 372/6 |
| 6,078,716 | A * | 6/2000 | Huang et al. | 385/126 |
| 6,212,305 | B1 | 4/2001 | Pan | 385/11 |
| 6,272,155 | B1 * | 8/2001 | Sekiguchi | 372/6 |
| 6,374,009 | B1 * | 4/2002 | Chang et al. | 385/18 |
| 6,453,084 | B1 * | 9/2002 | Stanford et al. | 385/18 |
| 6,542,675 | B1 * | 4/2003 | Tourgee et al. | 385/115 |
| 7,027,699 | B2 * | 4/2006 | Tao et al. | 385/126 |
| 7,242,827 | B1 * | 7/2007 | Bochove | 385/30 |
| 8,320,724 | B2 * | 11/2012 | Sasaoka | 385/121 |
| 8,649,646 | B2 * | 2/2014 | Solarz | 385/125 |
| 8,655,131 | B2 * | 2/2014 | Sasaoka | 385/126 |
| 2002/0024727 | A1 * | 2/2002 | Wilcox et al. | 359/342 |
| 2002/0054725 | A1 * | 5/2002 | Ivtsenkov et al. | 385/7 |
| 2002/0176677 | A1 * | 11/2002 | Kumar et al. | 385/126 |
| 2002/0180869 | A1 * | 12/2002 | Callison et al. | 348/203 |
| 2004/0208440 | A1 * | 10/2004 | Tateiwa | 385/33 |
| 2004/0264513 | A1 * | 12/2004 | Shima et al. | 372/6 |
| 2005/0013573 | A1 * | 1/2005 | Lochkovic et al. | 385/128 |
| 2005/0069269 | A1 * | 3/2005 | Libori et al. | 385/125 |
| 2005/0100282 | A1 * | 5/2005 | Okada et al. | 385/46 |
| 2007/0078500 | A1 * | 4/2007 | Ryan et al. | 607/88 |
| 2007/0154153 | A1 * | 7/2007 | Fomitchov | 385/115 |
| 2007/0274639 | A1 * | 11/2007 | Shibayama | 385/49 |
| 2008/0069504 | A1 * | 3/2008 | Hiraga et al. | 385/106 |
| 2008/0245980 | A1 * | 10/2008 | Diatzikis | 250/559.08 |
| 2009/0003764 | A1 * | 1/2009 | Ridder et al. | 385/14 |
| 2009/0324242 | A1 * | 12/2009 | Imamura | 398/142 |
| 2010/0183271 | A1 * | 7/2010 | Smith et al. | 385/120 |
| 2010/0296784 | A1 | 11/2010 | Imamura | |
| 2011/0188855 | A1 * | 8/2011 | Kokubun et al. | 398/43 |
| 2011/0222828 | A1 * | 9/2011 | Sasaoka et al. | 385/127 |
| 2011/0249940 | A1 * | 10/2011 | Sasaoka et al. | 385/39 |
| 2011/0274398 | A1 * | 11/2011 | Fini et al. | 385/124 |
| 2011/0274435 | A1 * | 11/2011 | Fini et al. | 398/139 |
| 2012/0014639 | A1 * | 1/2012 | Doany et al. | 385/14 |
| 2012/0087619 | A1 * | 4/2012 | Rogers | 385/13 |
| 2012/0087626 | A1 * | 4/2012 | Nagashima et al. | 385/124 |
| 2012/0155805 | A1 * | 6/2012 | Doerr | 385/37 |
| 2012/0155806 | A1 * | 6/2012 | Doerr et al. | 385/37 |
| 2012/0163801 | A1 * | 6/2012 | Takenaga et al. | 398/16 |
| 2012/0195563 | A1 * | 8/2012 | Takenaga et al. | 385/126 |
| 2012/0219254 | A1 * | 8/2012 | Bradley et al. | 385/78 |
| 2012/0219255 | A1 | 8/2012 | Bradley et al. | |
| 2013/0195411 | A1 * | 8/2013 | Nagashima et al. | 385/126 |
| 2013/0259429 | A1 * | 10/2013 | Czosnowski et al. | 385/78 |
| 2014/0010507 | A1 * | 1/2014 | Sasaki et al. | 385/126 |
| 2014/0036351 | A1 * | 2/2014 | Fini et al. | 359/341.31 |
| 2014/0119694 | A1 * | 5/2014 | Abedin et al. | 385/43 |

FOREIGN PATENT DOCUMENTS

| | | |
|---|---|---|
| JP | 2011-215556 A | 10/2011 |
| JP | 2013-029758 A | 2/2013 |
| JP | 2013-033863 A | 2/2013 |
| JP | 2013-033865 A | 2/2013 |
| JP | 2013-050695 A | 3/2013 |
| JP | 2013-117664 A | 6/2013 |
| JP | 2013-522680 A | 6/2013 |
| JP | 2013-238692 A | 11/2013 |
| WO | WO-2010/073821 A1 | 7/2010 |
| WO | WO-2011/116137 A1 | 9/2011 |
| WO | WO 2012/121027 | 9/2012 |

* cited by examiner

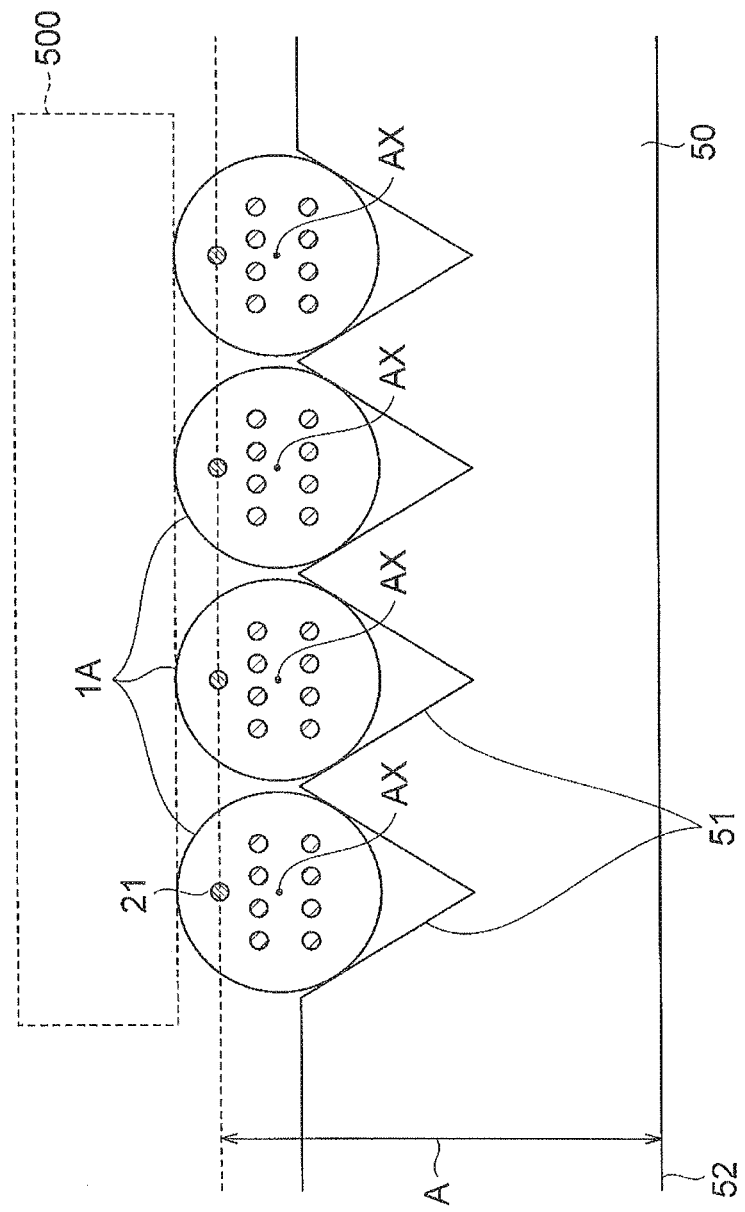

MULTI-CORE OPTICAL FIBER AND METHOD FOR MANUFACTURING MULTI-CORE OPTICAL FIBER CONNECTOR

TECHNICAL FIELD

The present invention relates to a multi-core optical fiber (hereinafter referred to as "MCF") and a method for manufacturing a multi-core optical fiber connector (hereinafter referred to as "MCF connector").

BACKGROUND ART

An MCF is comprised of a plurality of cores extending along a fiber axis direction (which is a direction coinciding with the longitudinal direction of the MCF and extending along the fiber axis passing a center of a cross section of the MCF perpendicular to the longitudinal direction), and a common cladding covering each of these cores. Each of the cores optically functions as an optical waveguide. Since the MCF has a larger number of cores per unit cross-sectional area than a single-core fiber does, it is suitable for transmission of large volumes of information.

As a method for fusion splice between two MCFs, Patent Literature 1 discloses an example of implementing optical axis alignment between the MCFs by making use of marker portions provided in the respective MCFs. Specifically, in a fusion splice operation, first, while monitoring the side faces of the two MCFs as splicing objects, each of the MCFs is rotated around the fiber axis and the two MCFs are checked as to positions after rotation (hereinafter referred to as "rotational positions") of the cores and marker portion varying with the rotation. When agreement is confirmed between monitor patterns of the two MCFs (or between arrangements each consisting of the cores and marker portion in the MCFs, which are displayed on a monitor screen during monitoring their side faces), an alignment work is carried out by horizontally/vertically moving the core positions while keeping the end faces of the two MCFs facing each other. After the alignment, the end faces of the two MCFs as splicing objects are subjected to fusion splice.

CITATION LIST

Patent Literature

Patent Literature 1: Japanese Patent Application Laid-open Publication No. 2013-50695

SUMMARY OF INVENTION

Technical Problem

The Inventors conducted research on the conventional MCFs and others and found the problem as described below. Specifically, the splice method described in the above Patent Literature 1 is carried out with comparison between the monitor patterns of the two MCFs, and it is considered that the positions of the cores in each MCF can be unspecified positions. For enabling the monitoring of the side faces, it was necessary to locate the marker at a position off an arbitrary line-symmetric axis to define line symmetry of the core arrangement in the cross section of the MCF. In the case of a connector component such as an array in which rotational positions of a plurality of MCFs one-dimensionally arranged each are aligned, splicing objects of these MCFs are not determined. In manufacturing a component in which, by making use of a plurality of MCFs each having core arrangement positions one-dimensionally arranged like the array, the arrangement directions of the cores (hereinafter referred to as "core arrangement directions") in these MCFs are aligned each with a specific direction, there was a need for a method allowing us to easily and accurately specify the core arrangement directions of the respective MCFs.

The present invention has been accomplished in order to solve the problem as described above, and it is an object of the present invention to provide an MCF with a structure allowing the core arrangement directions of one or more MCFs forming a connector component (e.g., an MCF connector) to be accurately aligned, and a method for manufacturing a connector component in which the core arrangement directions of one or more MCFs each are aligned.

Solution to Problem (1) An embodiment of the present invention relates to a method for manufacturing an MCF connector having one or more MCFs and a connector, and each of the MCFs comprises a plurality of cores, a marker, and a common cladding. The plurality of cores are arranged on a first straight line on a fiber cross section. In a cross section of each of the MCFs, the marker includes an element (first marker element) provided at a first position on a second straight line being perpendicular to the first straight line and passing a center of the cross section, or, elements (two second marker elements) provided at two second positions symmetric with respect to the second straight line. The method for manufacturing the MCF connector according to the embodiment of the invention comprises at least an arrangement step and a rotational alignment step. After the rotational alignment, the MCFs each rotationally aligned are fixed to the connector. In the arrangement step, each of the MCFs is arranged at a predetermined position of the connector. In the rotational alignment step, while monitoring the marker, each of the MCFs is rotated so that a rotational position of the marker comes to coincide with a specific position (by rotation around a fiber axis of the MCF (coincident with the longitudinal direction)). As each of the MCFs is rotationally aligned using the marker as an index, the core arrangement direction is aligned with a specific direction in each of the MCFs arranged in the connector.

(2) The embodiment of the invention relates to a method for manufacturing an MCF connector having one or more MCFs and a connector, and each of the MCFs comprises a plurality of cores, a marker, and a common cladding. The plurality of cores are arranged on a first straight line on a fiber cross section. In a cross section of each of the MCFs, the marker is provided at a third position on a third straight line being perpendicular to the first straight line and passing a specific core included in the plurality of cores. The method for manufacturing the MCF connector according to the embodiment of the invention comprises at least an arrangement step and a rotational alignment step. After the rotational alignment, the MCFs each rotationally aligned may be fixed to the connector. In the arrangement step, each of the MCFs is arranged at a predetermined position of the connector. In the rotational alignment step, the marker is monitored in the cross section of each of the MCFs. While performing the cross section monitoring in this manner, each of the MCFs is rotated so that a rotational position of the marker comes to coincide with a specific position. Specifically, each of the MCFs is rotated so as to minimize each of a distance between the markers between adjacent MCFs, a distance between the specific cores between the adjacent MCFs, and a distance between the first straight lines between the adjacent MCFs. As a result, the core arrangement direction is aligned with a specific direction in each of the MCFs arranged in the connector. The distance between the first straight lines between the adjacent MCFs is defined as a center-to-center distance between a core in one MCF closest to the other MCF among the cores arranged on the first straight line in the one MCF and a core in the other MCF closest to the one MCF among the cores arranged on the first straight line in the other MCF.

(3) The embodiment of the invention relates to a method for manufacturing an MCF connector having one or more MCFs and a connector, and each of the MCFs comprises a plurality of cores, a marker, and a common cladding. The plurality of cores are arranged on a first straight line on a fiber cross section. In each of the MCFs, the marker is provided at a fourth position on a view field where the marker is superimposed on a specific core included in the plurality of cores, when a side face of the MCF is monitored along a direction perpendicular to the first straight line. The method for manufacturing the MCF connector according to the embodiment of the invention comprises at least an arrangement step and a rotational alignment step. After the rotational alignment, the MCFs each rotationally aligned are fixed to the connector. In the arrangement step, each of the MCFs is arranged at a predetermined position of the connector. In the rotational alignment step, the marker is monitored from the side face of each of the MCFs. While performing such side face monitoring, each of the MCFs is rotated so that a rotational position of the marker comes to coincide with a specific position. Specifically, each of the MCFs is rotated so as to match positions on a monitor of the marker and the specific core with each other, on a monitor screen displaying the side faces of the respective MCFs, as monitored in the side face monitoring. As a result, the core arrangement direction is aligned with a specific direction in each of the MCFs arranged in the connector.

(4) The embodiment of the invention relates to an MCF comprising a plurality of cores, a marker, and a common cladding individually surrounding these cores and marker. In a cross section of the MCF, the plurality of cores are arranged along a first straight line. In the cross section of the MCF, the marker includes a first marker element provided at a first position on a second straight line being perpendicular to the first straight line and passing a center of the cross section, or, second marker elements provided at two respective second positions symmetric with respect to the second straight line.

(5) The embodiment of the invention relates to an MCF comprising a plurality of cores, a marker, and a common cladding individually surrounding these cores and marker. In a cross section of the MCF, the plurality of cores are arranged along a first straight line. In the cross section of the MCF, the marker is provided at a third position on a third straight line being perpendicular to the first straight line and passing a midpoint between two adjacent cores out of the plurality of cores.

(6) The embodiment of the invention relates to an MCF comprising a plurality of cores, a marker, and a common cladding individually surrounding these cores and marker. In a cross section of the MCF, the plurality of cores are arranged along a first straight line. When a side face of the MCF is monitored along a direction perpendicular to the first straight line, the marker is provided at a fourth position on a view field where the marker is superimposed on a specific core included in the plurality of cores.

Advantageous Effect of Invention

The present invention has made it feasible to provide the MCF with the structure allowing the core arrangement directions of the MCFs held in the connector to be accurately aligned, and the method for manufacturing the MCF connector.

BRIEF DESCRIPTION OF DRAWINGS

FIG. 2 is a drawing of a case where the MCFs of the first embodiment are arranged.

DESCRIPTION OF EMBODIMENTS

Figure 1:
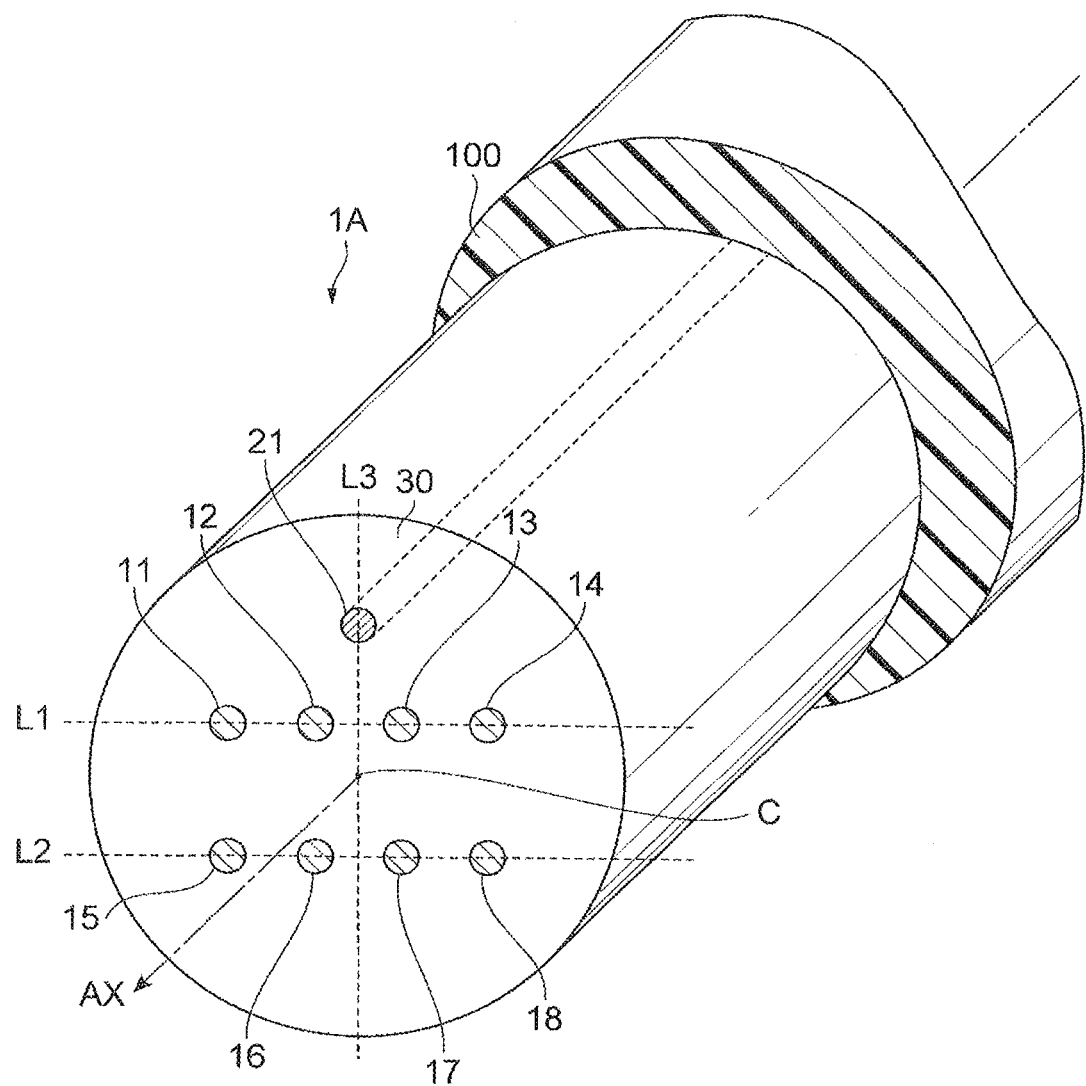
FIG. 1 is a cross-sectional view of the MCF according to the first embodiment.

Description of Aspects of Embodiment of Invention

First, aspects of the embodiment of the invention will be described as enumerated below.

(1) A first aspect relates to a method for manufacturing an MCF connector and the MCF connector comprises one or more MCFs, and a connector having an installation face on which ends of the MCFs each are held, and a bottom face opposed to the installation face. The manufacturing method according to the first aspect comprises an arrangement step and a rotational alignment step. After the rotational alignment, the MCFs are bonded to be fixed to the connector (fixing step). In the arrangement step, each of the ends of the MCFs is arranged at a predetermined position on the installation face of the connector. In the rotational alignment step, each of the MCFs is rotated around a longitudinal direction of the MCF to adjust a rotational position of a cross section of each MCF, perpendicular to the longitudinal direction. Each of the MCFs comprises a plurality of cores extending along the longitudinal direction, a marker extending along the longitudinal direction while being separated from each of the cores, and a common cladding individually surrounding the plurality of cores and the marker. In the cross section of each of the MCFs, a core arrangement consisting of the plurality of cores includes one or more linear arrangement elements and each of the linear arrangement elements is comprised of two or more cores arranged on a first straight line or on a straight line parallel to the first straight line. In the cross section of each of the MCFs, the marker includes at least one first marker element (at a first position) arranged on a second straight line being perpendicular to the first straight line and passing a center of the cross section, or, at least two second marker elements (at second positions) arranged in symmetry with respect to the second straight line. In the rotational alignment step, each of the MCFs is rotated around the longitudinal direction so as to locate the marker at a specific position, while monitoring the marker. By this rotational alignment, each of extending directions of the linear arrangement elements in the MCFs is aligned with a specific direction.

In the first aspect, as described above, each of the core arrangement directions in the MCFs is aligned with the specific direction, while monitoring the first marker element or the second marker elements. This facilitates positioning of the rotational direction around the longitudinal direction (fiber axis), for each of the MCFs.

(2) As a second aspect applicable to the above first aspect, the rotational alignment step may be configured to perform cross section monitoring to monitor each of the markers in the cross sections of the MCFs. In this cross section monitoring, when each of the markers of the MCFs includes the one first marker element and when a position of the one first marker element is represented by a height with respect to the bottom face of the connector, the rotational alignment step is carried out to rotationally align each of the MCFs around the longitudinal direction so that the one first marker element is located at a highest position for all of the MCFs or so that the one first marker element is located at a lowest position for all of the MCFs. On the other hand, in the cross section monitoring, when each of the markers of the MCFs includes the two second marker elements and when a position of each of the two second marker elements is represented by a height with respect to the bottom face of the connector, the rotational alignment step is carried out to rotationally align each of the MCFs around the longitudinal direction so that the two second marker elements are located at positions where an average of heights thereof is maximum for all of the MCFs, so that the two second marker elements are located at positions where the average of the heights thereof is minimum for all of the MCFs, or, so that the two second marker elements are located at positions where the heights thereof are equal for all of the MCFs. According to this second aspect, the rotational alignment is carried out while monitoring the cross section of each of the MCFs. In this case, since there is no influence made from variation in outer diameter or the like along the longitudinal direction, of each MCF, the rotational alignment of each MCF is facilitated.

(3) As a third aspect applicable to the first or second aspect, the rotational alignment step may be configured to perform side face monitoring to monitor the marker from a side face of each of the MCFs. In this side face monitoring, when each of the markers of the MCFs includes the one first marker element, the rotational alignment step is carried out to rotationally align each of the MCFs around the longitudinal direction so that the one first marker element is coincident with a central axis (fiber axis) of the MCF including the first marker element for all of the MCFs. On the other hand, in the side face monitoring, when each of the markers of the MCFs includes the two second marker elements, the rotational alignment step is carried out to rotationally align each of the MCFs around the longitudinal direction so that the central axis (fiber axis) of the MCF including the two second marker elements is coincident with a midpoint of a line segment connecting centers of the two second marker elements for all of the MCFs, or, so that distances from each of the two second marker elements to the central axis (fiber axis) of the MCF including the two second marker elements are equal for all of the MCFs. According to this third aspect, the rotational alignment is carried out while monitoring the side face of each of the MCFs. In this case, since there is no influence made from variation in outer diameter or the like along the longitudinal direction, of each MCF, the rotational alignment of each MCF is facilitated.

(4) As a fourth aspect applicable to at least any one of the above first to third aspects, each of the MCFs may further comprise a reference marker extending along the longitudinal direction and arranged at a position different from that of the marker, on the second straight line in the cross section. In this fourth aspect, the rotational alignment step is carried out to monitor each of the markers in side faces of the MCFs. In this side face monitoring, when each of the markers of the MCFs includes the one first marker element, the rotational alignment step is carried out to rotationally align each of the MCFs around the longitudinal direction so that the reference marker is coincident with the marker for all of the MCFs. On the other hand, when each of the markers of the MCFs includes the two second marker elements, the rotational alignment step is carried out to rotationally align each of the MCFs around the longitudinal direction so that the reference marker is coincident with a midpoint of a line segment connecting centers of the two second marker elements for all of the MCFs. By this fourth aspect, there is no influence made from variation in outer diameter or the like along the longitudinal direction, of each MCF, either, and thus the rotational alignment of each MCF is facilitated.

(5) A fifth aspect relates to a method for manufacturing an MCF connector and the MCF connector comprises one or more MCFs; and a connector having an installation face where ends of the MCFs each are held and a bottom face opposed to the installation face. The manufacturing method according to the fifth aspect comprises an arrangement step and a rotational alignment step. After the rotational alignment, the MCFs are bonded to be fixed to the connector (fixing step). In the arrangement step, each of the ends of the MCFs is arranged at a predetermined position on the installation face of the connector. In the rotational alignment step, each of the MCFs is rotated around a longitudinal direction of the MCF to adjust a rotational position of the cross section of the MCF, perpendicular to the longitudinal direction. Each of the MCFs comprises a plurality of cores extending along the longitudinal direction, a marker extending along the longitudinal direction while being separated from each of the cores, and a common cladding individually surrounding the plurality of cores and the marker. In a cross section of each of the MCFs, a core arrangement consisting of the plurality of cores includes one or more linear arrangement elements and each of the linear arrangement elements is comprised of two or more cores arranged on a first straight line or on a straight line parallel to the first straight line. In the cross section of each of the MCFs, the marker is arranged on a second straight line being perpendicular to the first straight line and passing a specific core out of the plurality of cores. In other words, the marker is arranged at a third position on a third straight line perpendicular to the first straight line and passing the specific core out of the plurality of cores. In the rotational alignment step, each of the MCFs is rotated around the longitudinal direction so as to locate the marker at a specific position, while monitoring the marker in the cross section. Specifically, each of the MCFs is rotationally aligned so as to minimize each of a distance between the markers in adjacent MCFs out of the MCFs arranged on the installation face, a distance between the specific cores in the adjacent MCFs, and a distance between the linear arrangement elements in the adjacent MCFs (distance between the first straight lines). By this rotational alignment, each of extending directions of the linear arrangement elements in the MCFs is aligned with a specific direction.

(6) A sixth aspect relates to a method for manufacturing an MCF connector and the MCF connector comprises one or more MCFs; and a connector having an installation face where ends of the MCFs each are held and a bottom face opposed to the installation face. The manufacturing method according to the sixth aspect comprises an arrangement step and a rotational alignment step. After the rotational alignment, the MCFs are bonded to be fixed to the connector (fixing step). In the arrangement step, each of the ends of the MCFs is arranged at a predetermined position on the installation face of the connector. In the rotational alignment step, each of the MCFs is rotated around a longitudinal direction of the MCF to adjust a rotational position of the cross section of each MCF, perpendicular to the longitudinal direction. Each of the MCFs comprises a plurality of cores extending along the longitudinal direction, a marker extending along the longitudinal direction while being separated from each of the cores, and a common cladding individually surrounding the plurality of cores and the marker. In a cross section of each of the MCFs, a core arrangement consisting of the plurality of cores includes one or more linear arrangement elements and each of the linear arrangement elements is comprised of two or more cores arranged on a first straight line or on a straight line parallel to the first straight line. In the cross section of each of the MCFs, the marker is arranged on a second straight line being perpendicular to the first straight line and passing a specific core out of the plurality of cores. In other words, the marker is arranged at a third position on a third straight line perpendicular to the first straight line and passing the specific core out of the plurality of cores. When each of the side faces of the MCFs is monitored along the line perpendicular to the first straight line, the marker is arranged at a position (fourth position) where the marker is superimposed on the specific core included in the plurality of cores, in each of the MCFs. In this side face monitoring, the rotational alignment step is carried out to rotate each of the MCFs around the longitudinal direction so as to make the marker and the specific core superimposed (preferably, so as to make them coincident with each other), while monitoring the marker and the specific core from the side face. The positional relationship between the marker and the specific core can be confirmed on a monitor screen. By this rotational alignment, each of extending directions of the linear arrangement elements in the MCFs is aligned with a specific direction.

(7) As a seventh aspect applicable to the sixth aspect, preferably, a maximum width of the marker as monitored from the side face is not more than a maximum width of the specific core, in each of the MCFs. In this case, visibility of the marker is improved and thus alignment accuracy can be improved. As an aspect applicable to at least any one of the first to seventh aspects, each of the MCFs preferably comprises a resin coat provided on an outer peripheral surface of the cladding. In the manufacturing methods according to the first to seventh aspects, the ends of the MCFs, from which the resin coat is removed in part, are arranged each on the installation face of the corrector.

The MCF according to the embodiment of the invention is one to which any one of eighth to tenth aspects as described below is applied.

(8) An MCF according to the eighth aspect comprises: a plurality of cores extending along a longitudinal direction of the MCF; a marker extending along the longitudinal direction while being separated from each of the plurality of cores; and a common cladding individually surrounding the plurality of cores and the marker. In a cross section of the MCF perpendicular to the longitudinal direction, a core arrangement consisting of the plurality of cores includes one or more linear arrangement elements and each of the linear arrangement elements is comprised of two or more cores arranged on a first straight line or on a straight line parallel to the first straight line. In the cross section of the multicore optical fiber, the marker includes at least one first marker element (at a first position) arranged on a second straight line being perpendicular to the first straight line and passing a center of the cross section, or, at least two second marker elements (at second positions) arranged in symmetry with respect to the second straight line.

(9) An MCF according to the ninth aspect comprises: a plurality of cores extending along a longitudinal direction of the MCF; a marker extending along the longitudinal direction while being separated from each of the plurality of cores; and a common cladding individually surrounding the plurality of cores and the marker. In a cross section of the MCF perpendicular to the longitudinal direction, a core arrangement consisting of the plurality of cores includes one or more linear arrangement elements and each of the linear arrangement elements is comprised of two or more cores arranged on a first straight line or on a straight line parallel to the first straight line. In the cross section of the MCF, the marker is arranged on a second straight line being perpendicular to the first straight line and passing a midpoint between two adjacent cores out of the cores belonging to one of the linear arrangement elements. In other words, the marker is arranged at a third position on a third straight line being perpendicular to the first straight line and passing the midpoint between the two adjacent cores out of the cores belonging to one of the linear arrangement elements.

(10) An MCF according to the tenth aspect comprises: a plurality of cores extending along a longitudinal direction of the MCF; a marker extending along the longitudinal direction while being separated from each of the plurality of cores; and a common cladding individually surrounding the plurality of cores and the marker. In a cross section of the MCF perpendicular to the longitudinal direction, a core arrangement consisting of the plurality of cores includes one or more linear arrangement elements and each of the linear arrangement elements is comprised of two or more cores arranged on a first straight line or on a straight line parallel to the first straight line. When a side face of the MCF is monitored along a direction perpendicular to the first straight line, the marker is arranged at a position where the marker is superimposed on a specific core included in the plurality of cores (fourth position).

Details of Embodiment of Invention

Specific examples of the MCF (multi-core optical fiber) and the method for manufacturing the MCF connector (multi-core optical fiber connector) according to the embodiment of the invention will be described below in detail with reference to the accompanying drawings. It should be noted that the present invention is by no means intended to be limited to these examples presented by way of illustration but is intended for inclusion of all changes within the meaning and scope of equivalency to the scope of claims, as described in the scope of claims.

First Embodiment

FIG. 1 is a cross-sectional view of MCF 1A according to the first embodiment. FIG. 1 shows a cross section perpendicular to the fiber axis AX (coincident with the longitudinal direction of the MCF). The MCF 1A of the first embodiment has eight cores 11 to 18 each extending along the fiber axis AX, a marker 21 extending along the fiber axis AX, a common cladding 30 individually surrounding these cores 11-18 and marker 21, and a resin coat 100 provided on the outer peripheral surface of the cladding 30. The cores 11-18 and marker 21 extend along the fiber axis AX. The refractive index of each of the cores 11-18 is higher than that of the cladding 30. The refractive index of the marker 21 is different from that of the cladding 30. In FIG. 1, the cross-sectional shape of each of the cores 11-18 and marker 21 is a circle but there are no particular restrictions on the cross-sectional shapes of these. The number of cores does not have to be limited to 8, but may be 9 or more, or, 6 or less. The resin coat 100 may be comprised of a plurality of resin layers.

Each of the cores 11-18, marker 21, and cladding 30 consists primarily of silica glass and is doped with an impurity for adjustment of refractive index as needed. For example, each of the cores 11-18 and marker 21 is made of silica glass doped with $GeO_2$, while the cladding 30 is made of pure silica glass. Or, for example, each of the cores 11-18 and marker 21 is made of pure silica glass, while the cladding 30 is made of silica glass doped with the element F. The core diameters of the respective cores 11-18 may be equal or unequal. The refractive indices of the respective cores 11-18 may be equal or unequal.

In a cross section perpendicular to the fiber axis AX, of the MCF 1A shown in FIG. 1, the cores 11 to 14 are arranged at equal intervals along a straight line L1 not passing the center of the MCF 1A. These cores 11-14 constitute first linear arrangement elements. The cores 15 to 18 are arranged at equal intervals along a straight line L2 not passing the cross-sectional center of the MCF 1A (a position on the cross section intersecting with the fiber axis AX). These cores 15-18 constitute second linear arrangement elements. The straight line L1 and line L2 are parallel to each other. The intervals of the cores 11-14 and the intervals of the cores 15-18 are properly adjusted so as not to generate crosstalk between them and, each set of the cores 12 and 13 and the cores 11 and 14 are arranged as equidistant from a straight line L3 (first straight line) passing the center of the MCF 1A and being perpendicular to the line L1 (L2). Similarly, each set of the cores 16 and 17 and the cores 15 and 18 are arranged as equidistant from the line L3. The marker 21 is arranged at a position (first position) outside the line L1 in the fiber and on the line L3. The number of straight lines for arrangement of the cores does not have to be limited to 2 but may be one or three or more.

The following will describe a method for manufacturing an MCF connector in which the MCFs 1A shown in FIG. 1 are arranged in an array form on an installation face of connector 50. As shown in FIG. 2, the manufacturing method includes an arrangement step and a rotational alignment step in an operation of arranging the plurality of MCFs 1A in the array form and, after the rotational alignment, each of the MCFs 1A is bonded to be fixed to the installation face of the connector 50 (fixing step). FIG. 2 shows the method for manufacturing the MCF connector in which the ends of the MCFs 1A are arranged in the array form on the installation face of the connector 50, and it is noted that a part of the configuration shown in this FIG. 2 corresponds to a configuration wherein only one MCF 1A is installed on the installation face of the connector 50. Examples of the rotational alignment step include a method of carrying out the rotational alignment while monitoring the end faces of the MCFs 1A (cross section monitoring) and a method of carrying out the alignment while monitoring the side faces of the MCFs 1A (side face monitoring).

Figure 3A:
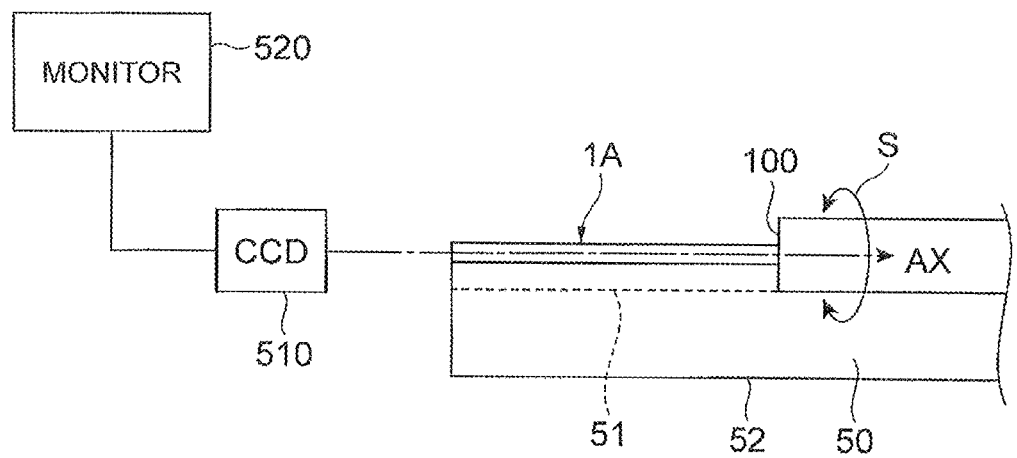
FIGS. 3A and 3B are drawings for illustrating various examples of the rotational alignment step.

First described is the method of carrying out the rotational alignment of each of the MCFs 1A while monitoring the end face of each of the MCFs 1A. FIG. 2 is a drawing to illustrate a step of attaching each of the MCFs 1A to the connector 50 provided with V-grooves 51 on the installation face opposed to a bottom face 52, as a method for one-dimensionally arranging the plurality of MCFs 1A. FIG. 3A is a drawing showing a configuration of a monitor device for carrying out the cross section monitoring in the rotational alignment step. The monitor device shown in FIG. 3A is composed of a CCD camera 510 as an imaging device and a monitor 520 for displaying an image taken in by the CCD camera 510. The configuration around the connector 50 in FIG. 3A is coincident with the configuration shown in FIG. 2; that is, the ends of the MCFs 1A from which the resin coat 100 is removed in part are arranged on the respective V-grooves 51 of the connector 50.

As shown in FIG. 2, the plurality of V-shaped grooves 51 are formed in the array form on the surface (installation face) of the connector 50 and the ends of the MCFs 1A (the portions from which the resin coat 100 is removed) are mounted on the respective V-grooves 51 (arrangement step). Here, the ends of the MCFs 1A thus mounted are pressed against the respective V-grooves 51 by a presser plate 500. The end faces of the MCFs 1A are cut approximately perpendicularly to the fiber axis AX and the end faces of the MCFs 1A each are monitored by the CCD camera 510. While checking the position of the marker 21 in the cross section displayed on the screen of the monitor 520 (monitor screen), the rotational position of each MCF 1A is adjusted (rotational alignment step). Here, each MCF 1A is rotated on the V-groove 51 so as to maximize a distance A between the marker 21 and the bottom face 52 of the connector 50 (a height of the marker 21 with respect to the bottom face 52). Specifically, each of the MCFs 1A is rotated around the fiber axis AX to implement such alignment that the markers 21 on the cross sections of the respective MCFs 1A are located at the same rotational position. The connector 50 does not have to be limited to the array using the V-grooves 51, but it may be one having holes for arrangement of the MCFs as many as the number of fibers (cf. FIG. 4B). The arrangement of the MCFs in the connector (the linear arrangement) does not have to be limited to one row, but it may be two or more rows.

In this regard, inter-fiber deviations of the outer diameters of the respective MCFs 1A are preferably smaller than 1 μm and core arrangement position errors, i.e., core position deviations from the fiber center are preferably such that an angle between the horizontal arrangement direction (the direction of the lines L1, L2) and a perpendicular thereto on which the marker 21 is provided (the line L3) is within the range not deviating more than 1° from 90°.

The above method allows the core arrangement directions of the MCFs 1A to be aligned with a specific direction, by only checking the positions of the markers 21. For this reason, the adjustment of the core positions can be readily achieved. Since the adjustment is performed while monitoring each of the cut end faces of the MCFs (cross section monitoring), it is feasible to readily achieve the end face observation and core position adjustment. If the positions of the cut end faces of the respective MCFs deviate in the longitudinal direction (the direction along the fiber axis AX), it is considered that it becomes difficult to perform the monitoring with the CCD camera 510 and the core position adjustment with high accuracy because of the deviation from the focal position.

FIG. 2 shows the example of the rotational alignment of each of the MCFs 1A to the position where the distance A between the marker 21 and the bottom face 52 of the connector 50 is maximum, but the rotational alignment can also be performed similarly with high accuracy by a method of rotating each of the MCFs 1A to a position where the distance A is minimum. The same effect is also achieved by making use of a connector to implement the fixing by a ferrule, instead of the connector provided with the V-grooves.

In the above-described example, the rotational alignment of the MCFs 1A arranged on the installation face of the connector 50 was carried out after the cutting of the ends, but the cutting of unnecessary ends may be carried out after completion of both of the rotational alignment step for each of the MCFs 1A and the fixing step between the MCFs 1A and the connector.

Figure 4A:
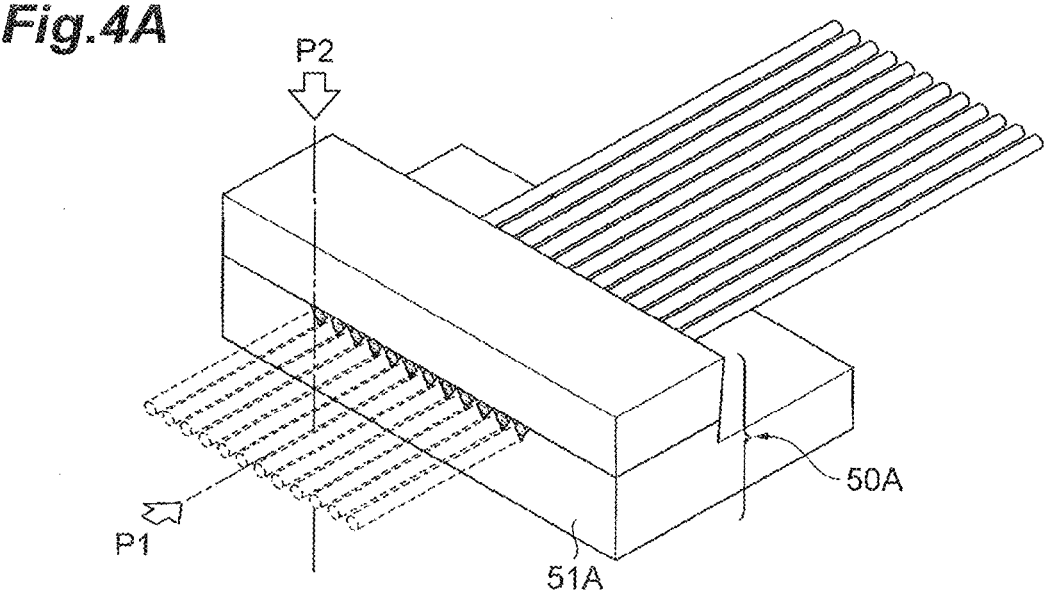
FIGS. 4A and 4B are drawings for illustrating various examples of the method for manufacturing the MCF connector.

For example, the MCF connector shown in FIG. 4A has a connector 50A and a plurality of MCFs the ends of which are fixed to the connector 50A. The connector 50A has a support member in which a plurality of V-grooves are formed on its installation face, and a presser plate grasping the ends of the MCFs from which the resin coat is removed in part, in conjunction with the support member. In a state in which the ends of the MCFs are simply grasped by the support member and the presser plate, the ends of the MCFs are kept each only projecting out from a connector end face 51A. Namely, each of the ends of the MCFs is held as rotatable by the support member and presser plate. The rotational alignment step is carried out while monitoring the ends of the MCFs projecting out from the connector end face 51A, from a direction of arrow P1 or from a direction of arrow P2. The monitoring of each of the ends of the MCFs from the arrow P1 direction corresponds to the cross section monitoring and the monitoring of each of the ends of the MCFs from the arrow P2 direction corresponds to the side face monitoring. After completion of the rotational alignment step, the support member, the presser plate, and the ends of the MCFs after the rotational alignment each are bonded to be fixed (fixing step). Thereafter, the MCF connector is obtained through the cutting of portions exposed from the connector end face 51A out of the ends of the MCFs and through polishing of the connector end face 51A.

Figure 4B:
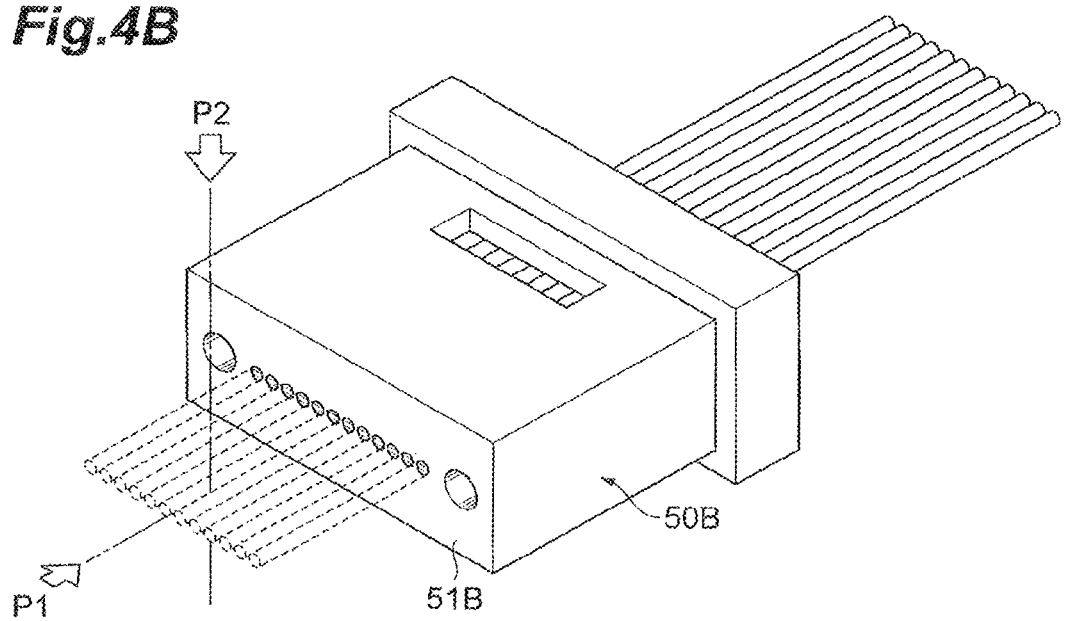

The MCF connector shown in FIG. 4B has a connector 50B and a plurality of MCFs the ends of which are fixed to the connector 50B. The connector 50B has a plurality of holes to hold the ends of the MCFs from which the resin coat is removed in part, while the ends penetrate through the holes. The plurality of holes do not have to be limited to one row but may be formed in two or more rows. The ends of the MCFs merely penetrating through the holes of the connector 50B are kept each simply projecting out from a connector end face 51B. Namely, each of the ends of the MCFs is held as rotatable by the hole of the connector 50B. The rotational alignment step is carried out while monitoring the ends of the MCFs projecting out from the connector end face 51B, from the arrow P1 direction or from the arrow P2 direction. The monitoring of each of the ends of the MCFs from the arrow P1 direction corresponds to the cross section monitoring and the monitoring of each of the ends of the MCFs from the arrow P2 direction corresponds to the side face monitoring. After completion of the rotational alignment step, the connector 50B and the ends of the MCFs after the rotational alignment each are bonded to be fixed (fixing step). Thereafter, the MCF connector is obtained through the cutting of portions exposed from the connector end face 51B out of the ends of the MCFs and through polishing of the connector end face 51B.

Figure 3B:
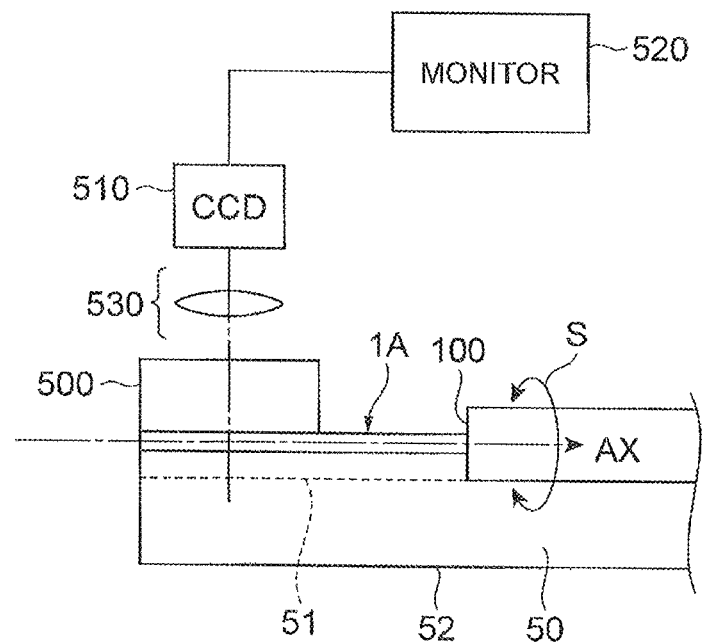

Next, the below will describe the case where the rotational alignment of each MCF 1A is carried out while monitoring each of the side faces of the MCFs 1A (side face monitoring). FIG. 3B is a thawing showing the configuration of the monitor device for carrying out the side face monitoring in the rotational alignment step. The monitor device shown in FIG. 3B is comprised of the CCD camera 510 as an imaging device, and the monitor 520 for displaying an image taken in by the CCD camera 510 through an optical system 530 such as a microscope. The ends of the MCFs 1A from which the resin coat 100 is removed in part are arranged on the respective V-grooves 51 of the connector 50 and these MCFs 1A are pressed against the V-grooves 51 by a presser plate 500 made of a transparent material. There is no light source illustrated in the monitor devices shown in FIGS. 3A and 3B, but these monitor devices may be equipped with a light source if a sufficient quantity of light cannot be secured in the monitoring.

Specifically, when each of the side faces of the MCFs 1A is monitored, the rotational position of each MCF is adjusted so that a distance between the marker 21 and a measuring device such as the microscope is constant, in attaching the MCF 1A to the V-groove 51 of the connector 50 or to the ferrule. For attaching the MCFs 1A to the V-grooves 51 of the connector 50, we can adopt such a means as mounting the MCFs 1A on the V-grooves and thereafter pressing the MCFs 1A against the V-grooves 51 from top by the transparent presser plate 500.

Figure 5:
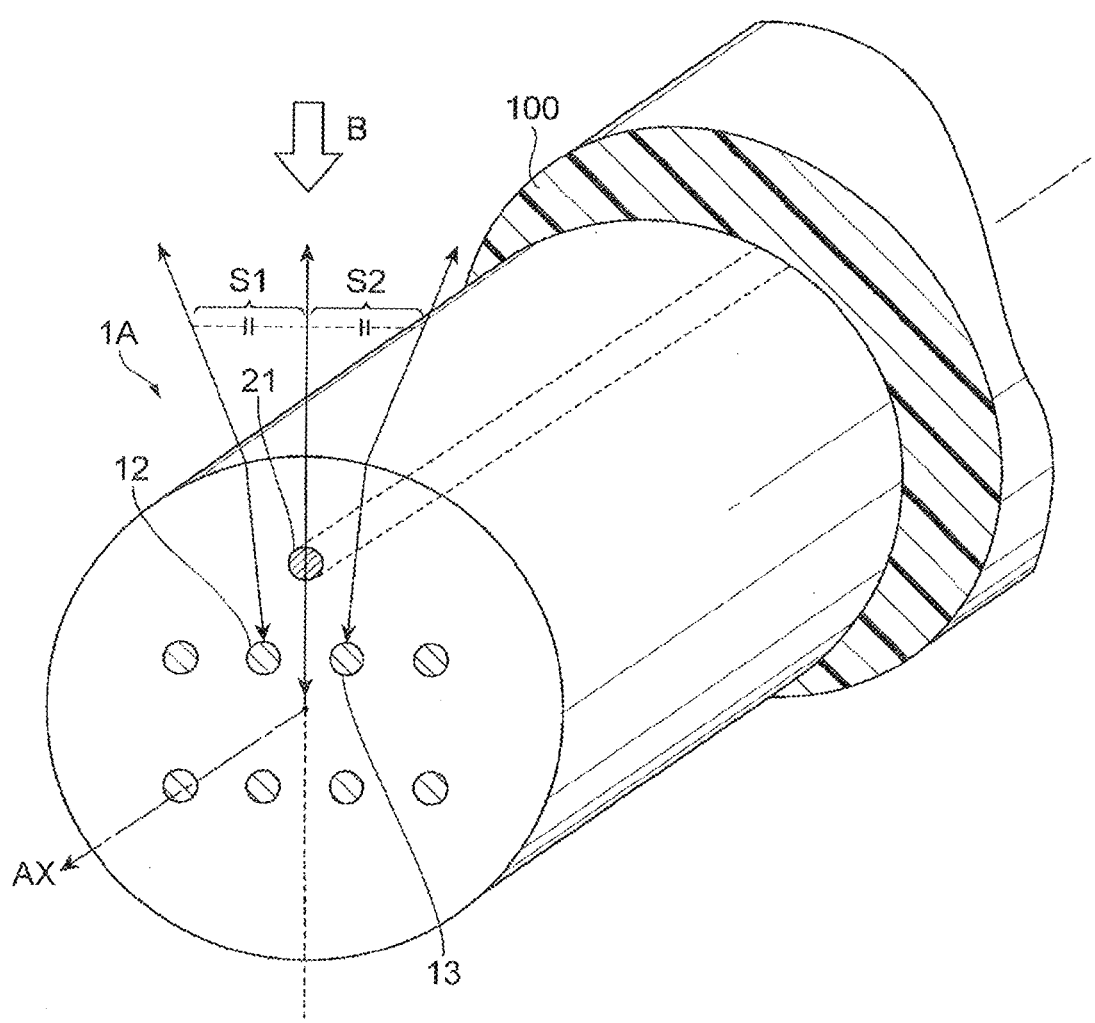
FIG. 5 is a drawing of a case where the MCF of the first embodiment is monitored from the side face (monitor screen).

For each of the MCFs 1A mounted on the V-grooves 51 of the connector 50, the rotational alignment is carried out while monitoring the marker 21 from the side face thereof. Through this rotational alignment step, each of the core arrangement directions in the MCFs 1A is aligned with the specific direction. At this time, the rotational direction is adjusted so that distances between the marker 21 and adjacent cores become equal, whereby the arrangement directions of the MCFs can be aligned. Specifically, while viewing the side face of the MCF 1A from a direction of arrow B in FIG. 5, the rotational alignment of the MCF 1A is carried out so that the distance S1 between the marker 21 and adjacent core 12 becomes equal to the distance S2 between the marker 21 and core 13.

As described above, the rotational alignment step is to perform the rotational alignment for each of the MCFs 1A while monitoring the marker 21 and cores around it (the cores 12, 13 herein) from the side face thereof. In this case, it is necessary to observe not only the marker 21 but also the neighboring cores, but the present embodiment allows the rotational alignment to be implemented so as to adjust each of the MCFs 1A to the same rotational position. The reason for it is that even if the outer diameter of MCF varies along the longitudinal direction, there is no change in relative positions and in angular relationship between the cores and marker (without being affected by the variation in outer diameter along the longitudinal direction).

Second Embodiment

Figure 6:
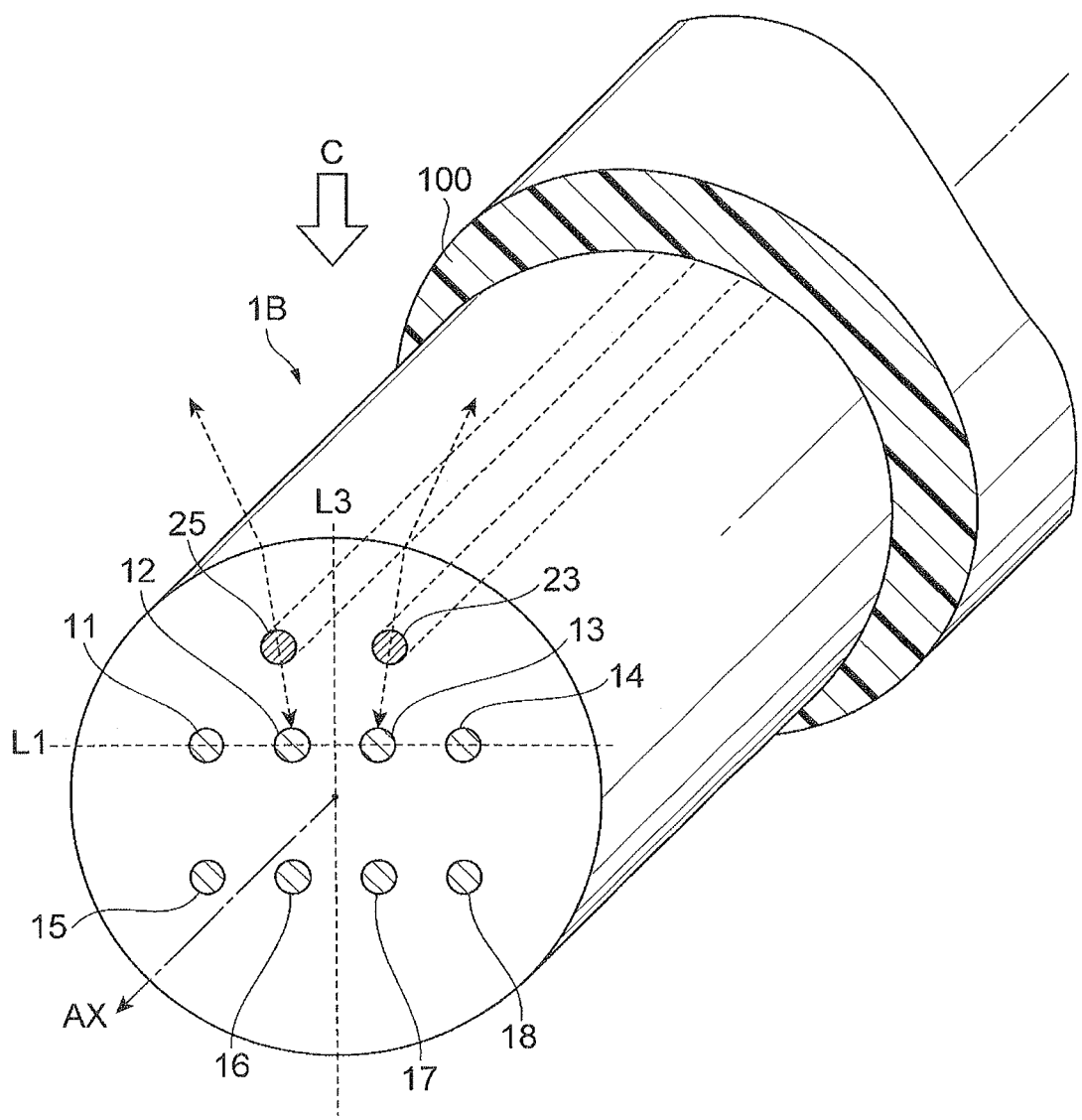
FIG. 6 is a cross-sectional view of the MCF according to the second embodiment.

FIG. 6 is a cross-sectional view of MCF 1B according to the second embodiment. FIG. 6 shows a cross section perpendicular to the fiber axis AX, of the MCF 1B. The MCF 1B of the second embodiment is different in the following point from the MCF 1A. Namely, the different point is that there are two markers 22, 23 provided.

The marker 22 in the MCF 1B is provided at a position where the marker 22 is superimposed on the core 12, when the side face of the MCF 1B is viewed from a direction of arrow C in FIG. 6. Similarly, the marker 23 in the MCF 1B is provided at a position (fourth position) where the marker 23 is superimposed on the core 13, when the side face of the MCF 1B is viewed from the direction of arrow C in FIG. 6.

The rotational alignment step for a plurality of MCFs 1B having this structure is carried out by the same methods as the methods shown in FIG. 2. For example, when the alignment is carried out while monitoring the end face, each MCF 1B is rotated so as to maximize the distance A of one marker out of the markers 22, 23 from the connector bottom face (the height of the marker with respect to the connector bottom face) in the same manner as in the first embodiment. It results in aligning each of the plurality of MCFs 1B to the same rotational position and thus suitably aligning the core arrangement directions in the MCFs 1B. The rotational alignment may be performed for each of the MCFs 1B so as to minimize the distance A.

Referring to each MCF 1B, the MCF 1B may be rotated so as to make the markers 22, 23 horizontal when the end face of the MCF 1B is viewed. By arranging each of the MCFs 1B rotated in this manner on the installation face of the connector, the rotational alignment of the MCFs 1B can be performed with accuracy.

For example, when the alignment is performed while monitoring the side face, each MCF 1B may be rotated so that both of the markers 22, 23 of the MCF 1B are superimposed on the cores 12, 13 when the side face of the MCF 1B is viewed from a predetermined direction (the direction of arrow C). By arranging each of the MCFs 1B rotated in this manner on the installation face of the connector, the rotational alignment of the MCFs 1B can be performed with accuracy.

Figure 7:
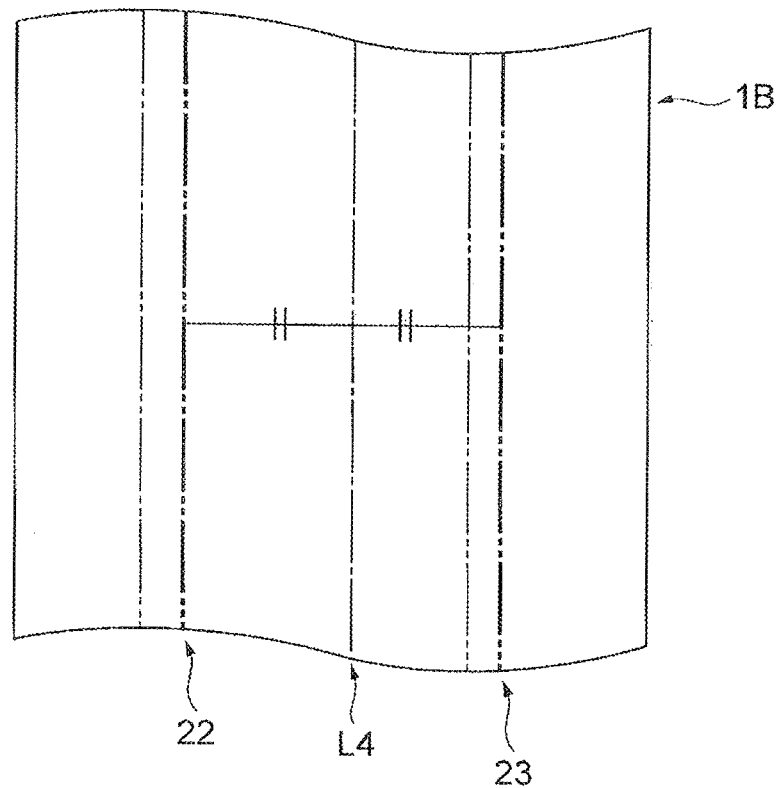
FIG. 7 is a drawing of a case where the MCF of the second embodiment is monitored from the side face (monitor screen).

Furthermore, when the fiber is provided with two markers, the alignment can be carried out by the following method in the rotational alignment step. Namely, as shown in FIG. 7, the alignment is performed so that distances between each of the two markers 22, 23 and a line coincident with the fiber axis AX of the MCF 1B (a straight line L4 in FIG. 7, which will be referred to hereinafter as "fiber axis line") become equal. When the alignment is performed in this manner, the markers 22, 23 are preferably located at positions symmetric with respect to a straight line passing the cross-sectional center (fiber axis line) and being perpendicular to the line L1 (which corresponds to the line L3 in FIG. 6). It is noted, however, that, without having this configuration, the rotational alignment of MCF can also be performed based on the positional relationship between the two markers and the fiber axis line.

Third Embodiment

Figure 8:
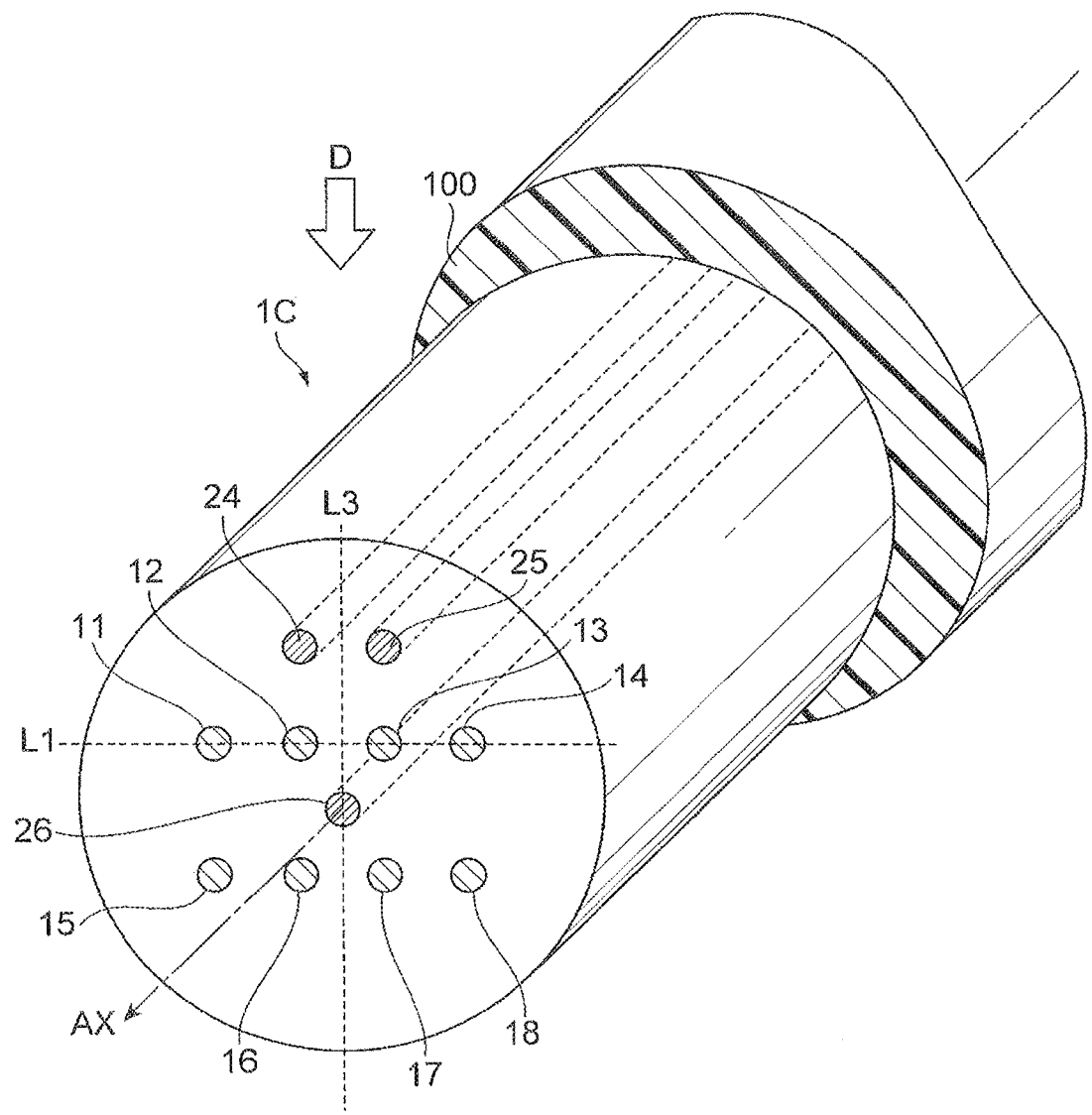
FIG. 8 is a cross-sectional view of the MCF according to the third embodiment.

FIG. 8 is a cross-sectional view of MCF 1C according to the third embodiment. FIG. 8 shows a cross section perpendicular to the fiber axis AX. The MCF 1C of the third embodiment is different in the following point from the MCF 1A. Namely, the different point is that the fiber is provided with two markers 24, 25 and a reference marker 26.

The markers 24, 25 are preferably provided at positions symmetric with respect to a straight line L3 passing the cross-sectional center (bordered position in the cross section intersecting with the fiber axis AX) and being perpendicular to the line L1. The reference marker 26 is provided on the straight line L3. In the MCF 1C according to the present embodiment, the reference marker 26 is disposed at the center of the MCF 1C, but it may be located below the cores 15-18 in the drawing or may be located outside the markers 24, 25.

The rotational alignment step for a plurality of MCFs 1C having this structure is also carried out by the same methods as the methods shown in FIG. 2. For example, when the alignment is carried out while monitoring the end face, each MCF 1C is rotated so as to maximize the distance A of one marker out of the markers 24, 25 from the connector bottom face in the same manner as in the second embodiment. It results in aligning each of the plurality of MCFs 1C to the same rotational position and thus suitably aligning the core arrangement directions in the MCFs 1C. The rotational alignment may be performed for each of the MCFs 1C so as to minimize the distance A.

Referring to each MCF 1C, the MCF 1C may be rotated so as to make the markers 24, 25 horizontal when the end face of the MCF 1C is viewed. By arranging each of the MCFs 1C rotated in this manner on the installation face of the connector, the rotational alignment of the MCFs 1C can be performed with accuracy.

For example, when the alignment of each MCF 1C is performed while monitoring the side face, the MCF 1C may be rotated so that the reference marker 26 is located at a midpoint between the markers 24, 25 of the MCF 1C when the side face of the MCF 1C is viewed from a predetermined direction (the direction of arrow D). By arranging each of the MCFs 1C rotated in this manner on the installation face of the connector, the rotational alignment of MCFs 1C can be performed with accuracy. In the case where the plurality of MCFs 1C are arranged on the installation surface of the connector, the core arrangement directions of the plurality of the MCFs 1C can be suitably aligned.

Fourth Embodiment

Figure 9:
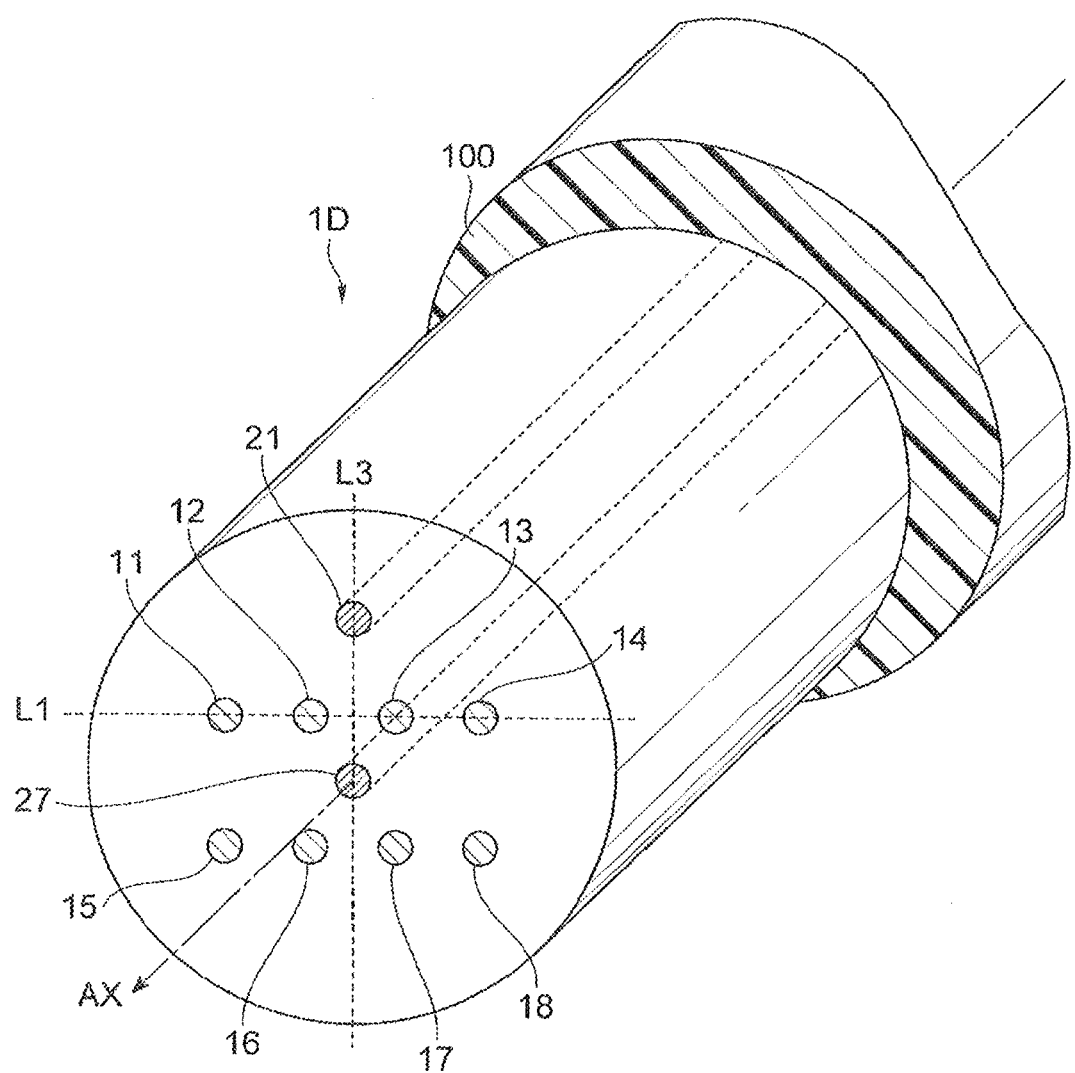
FIG. 9 is a cross-sectional view of the MCF according to the fourth embodiment.

FIG. 9 is a cross-sectional view of MCF 1D according to the fourth embodiment FIG. 9 shows a cross section perpendicular to the fiber axis AX, of the MCF 1D. The MCF 1D of the fourth embodiment is different in the following point from the MCF 1A. Namely, the different point is that a reference marker 27 is provided on the line L3, in addition to the marker 21.

The reference marker 27 in the MCF 1D is provided on the line L3. In the MCF 1D according to the present embodiment, the reference marker 27 is disposed at the cross-sectional center of the MCF 1D, but it may be located below the cores 15-18 in the drawing or may be located outside the marker 21.

The rotational alignment step for a plurality of MCFs 1D having this structure is also carried out by the same methods as the methods shown in FIG. 2. For example, when the alignment is carried out while monitoring the end face, each MCF 1D is rotated so as to maximize the distance A between the marker 21 and the connector bottom face in the same manner as in the first embodiment. It results in aligning each of the plurality of MCFs 1D to the same rotational position and thus suitably aligning the core arrangement directions in the MCFs 1D. The rotational alignment may be performed for each of the MCFs 1D so as to minimize the distance A.

Referring to each MCF 1D, for example, when the alignment of the MCF 1D is performed while monitoring the side face, the MCF 1D may be rotated so that the marker 21 and the reference marker 27 of the MCF 1D are superimposed when the side face of the MCF 1D is viewed from a predetermined direction. When the MCFs 1D each rotated in this manner are arranged on the installation face of the connector, the rotational alignment of each MCF 1D can be performed with accuracy.

When the alignment is performed while monitoring the side face as described above, there is a constant geometric position relationship maintained among the cores, marker, and reference marker, even with variation in fiber outer diameter; therefore, the alignment can be performed with higher accuracy for the MCFs 1D.

Modification Examples

Figure 10A:
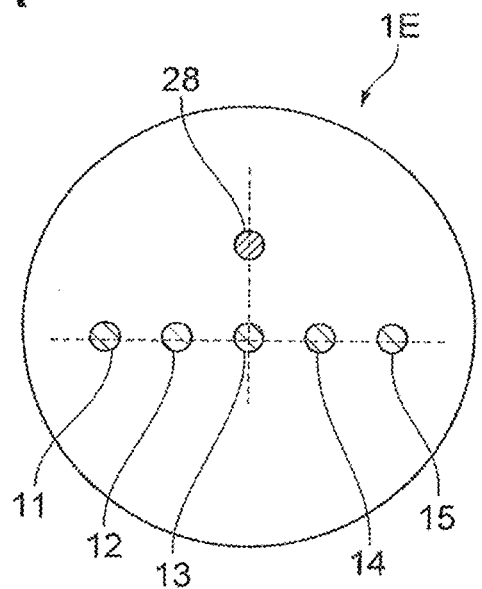
FIGS. 10A and 10B are cross-sectional views of the MCFs according to modification examples.
Figure 10B:
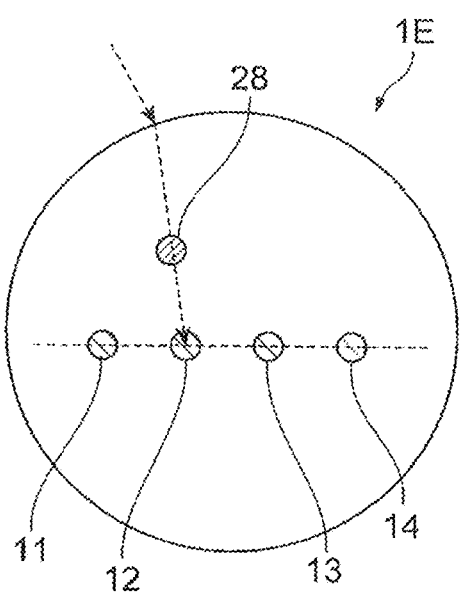

Next, modification examples of the MCF according to the embodiment of the invention will be described with reference to FIGS. 10A and 10B. In cross sections of MCFs 1E shown in FIGS. 10A and 10B, one marker 28 is provided for the cores 11-14 (or 11-15) each arranged on the line L1. Among them, in the MCF 1E in FIG. 10A, the marker 28 is provided on a straight line L5 passing the center core 13 out of the five aligned cores 11-15. This core 13 is disposed at the center of the MCF 1E. In the MCF 1E in FIG. 10B, when viewed from the side face, the marker 28 is disposed at a position where the marker 28 is superimposed on the core 12. Among them, in the case of the MCF 1E shown in FIG. 10A, the rotational alignment of the MCF 1E can be performed while monitoring the cross section by the aforementioned method. For each of the MCFs 1E shown in FIGS. 10A and 10B, the rotational alignment of the MCF 1E can be performed by rotating the fiber so as to make the marker 28 superimposed on the specific core, while monitoring the side face. As described above, the position of the marker can be changed as occasion demands. It is noted that the arrangements of the markers in the respective embodiments described above may be used in combination.

The above described the configurations wherein the plurality of MCFs were arranged on the respective V-grooves in the MCF connector, but the circular through holes may be adopted instead of the V-grooves, as shown in FIG. 4B. In the case of the V-grooves, the connector may be configured as an array type connector of the structure in which the core arrangement directions of the MCFs are aligned with a specific direction and in which the MCFs are pressed from top by the presser plate 500. The above embodiments showed the examples of the connectors with the MCFs arranged therein (fiber arrangement section) in which the through holes or V-grooves were one-dimensionally (linearly) arranged, but the connector may be configured with a plurality of rows of linear through holes or V-grooves are present in parallel.

The cross-sectional shape of the MCFs does not have to be limited to the circular shape, but the MCFs to be used may be, for example, those of a D-type cross-sectional shape with a linear part formed by removing a part of the outer periphery. In this case of the MCFs of the D-type cross-sectional shape, when the linear part is made coincident with the core arrangement direction, it functions to align the arrangement directions in the MCFs. It is based on the premise that the removed face (linear part) is aligned with the arrangement direction and the shape of the linear part is maintained.

In manufacturing the MCF connector using a plurality of MCFs having such a noncircular cross section, rotation of each MCF can also be suitably implemented by providing the connector where the MCFs are arranged (fiber arrangement section), with the array of normal circular holes or V-grooves.

Figure 11:
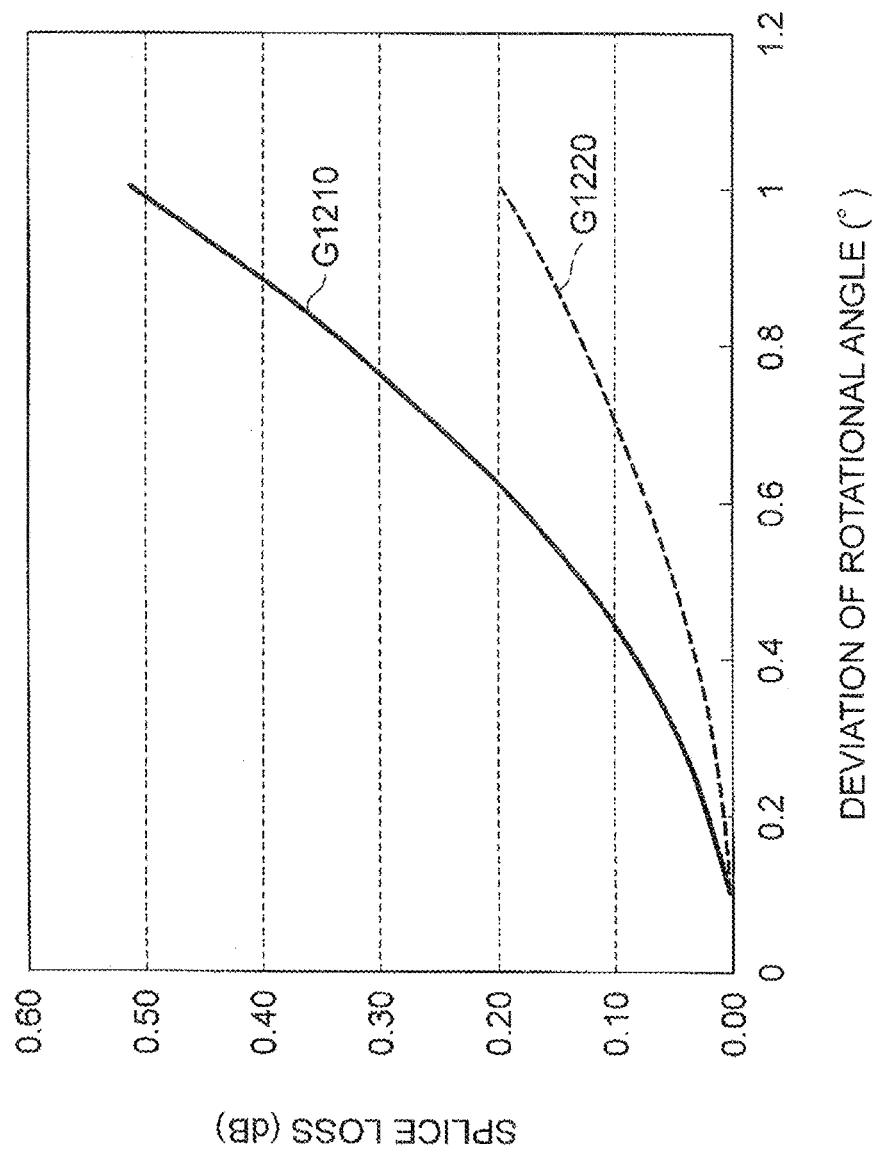
FIG. 11 is a drawing of evaluation on correspondence relationship between deviation of rotational angle and splice loss.

Finally, the position accuracy by the rotational alignment in the method for manufacturing the MCF connector will be described below. When MCFs are spliced after aligned, the splice loss is preferably not more than 0.5 dB. We conducted research on what accuracy was needed for the alignment to keep the splice loss not more than 0.5 dB. It was assumed herein that the cladding diameter (fiber diameter) was 250 μm and the MCFs were those having the core arrangement shown in FIG. 1. The relationship between deviation of rotational angle and splice loss was evaluated under the conditions that the core diameter was 8 μm, the core pitch on the lines L1, L2 47 μm, and the spacing between the line L1 and line L2 (e.g., the pitch between the core 11 and core 15) 94 μm. The result of this evaluation is shown in FIG. 11. In FIG. 11, graph G1210 shows the relationship between deviation of rotational angle and splice loss in the outer cores and graph G1220 the relationship between deviation of rotational angle and splice loss in the inner cores. The outer cores refer to the cores 11, 14, 15, and 18 being the cores located outside, and the inner cores refer to the cores 12, 13, 16, and 17 located on the center side. As shown in FIG. 11, for keeping the splice loss in all the cores not more than 0.5 dB, the deviation of rotational angle is preferably kept not more than 1° and the deviation of rotational angle is more preferably not more than 0.5°. Since the MCF and the method for manufacturing the MCF connector according to the embodiment of the invention allow the adjustment of rotational position to be implemented with accuracy, the splice loss in splicing between MCFs can be kept not more than 0.5 dB.

REFERENCE SIGNS LIST 1A to 1E multi-core optical fibers; 11 to 18 cores; 21 to 28 markers (markers and reference markers); 30 cladding; 100 resin coat; 510 CCD camera; 520 monitor; 530 optical system (microscope).

The invention claimed is:
1. A method for manufacturing a multi-core optical fiber connector comprising: one or more multi-core optical fibers; and a connector having an installation face or holes formed in a row in a longitudinal direction of an end face of the connector, and a bottom face opposed to the installation face or the holes, ends of the multi-core optical fibers being held by the installation face or the holes, the method comprising:
    an arrangement step of arranging each of the ends of the multi-core optical fibers at a predetermined position on the installation face or keeping the ends of the multi-core optical fibers respectively penetrate through the holes; and
    a rotational alignment step of rotating each of the multi-core optical fibers around a longitudinal direction of the multi-core optical fiber to adjust each of rotational positions of cross sections of the multi-core optical fibers, perpendicular to the longitudinal direction,
    wherein each of the multi-core optical fibers comprises; a plurality of cores extending along the longitudinal direction; a marker extending along the longitudinal direction while being separated from each of the plurality of cores; and a common cladding individually surrounding the plurality of cores and the marker, wherein in a cross section of each of the multi-core optical fibers, a core arrangement consisting of the plurality of cores includes one or more linear arrangement elements and each of the linear arrangement elements is comprised of two or more cores arranged on a first straight line or on a straight line parallel to the first straight line, wherein in the cross section of each of the multi-core optical fibers, the marker includes at least one first marker element arranged on a second straight line being perpendicular to the first straight line and passing a center of the cross section, or, at least two second marker elements arranged in symmetry with respect to the second straight line, and wherein in the rotational alignment step, each of the multi-core optical fibers is rotated around the longitudinal direction so as to locate the marker at a specific position, while monitoring the marker, to align each of extending directions of the linear arrangement elements in the multi-core optical fibers with a specific direction.

2. The method for manufacturing a multi-core optical fiber connector according to claim 1, wherein in the rotational alignment step, each of the markers in the cross sections of the multi-core optical fibers is monitored, wherein in the rotational alignment step, when each of the markers of the multi-core optical fibers includes the one first marker element and when a position of the one first marker element is represented by a height with respect to the bottom face of the connector, each of the multi-core optical fibers is rotationally aligned around the longitudinal direction so that the one first marker element is located at a highest position for all of the multi-core optical fibers or so that the one first marker element is located at a lowest position for all of the multi-core optical fibers, and wherein in the rotational alignment step, when each of the markers of the multi-core optical fibers includes the two second marker elements and when a position of each of the two second marker elements is represented by a height with respect to the bottom face of the connector, each of the multi-core optical fibers is rotationally aligned around the longitudinal direction so that the two second marker elements are located at positions where an average of heights thereof is maximum for all of the multi-core optical fibers, so that the two second marker elements are located at positions where the average of the heights thereof is minimum for all of the multi-core optical fibers, or, so that the two second marker elements are located at positions where the heights thereof are equal for all of the multi-core optical fibers.

3. The method for manufacturing a multi-core optical fiber connector according to claim 1, wherein in the rotational alignment step, each of the markers in side faces of the multi-core optical fibers is monitored, wherein in the rotational alignment step, when each of the markers of the multi-core optical fibers includes the one first marker element, each of the multi-core optical fibers is rotationally aligned around the longitudinal direction so that the one first marker element is coincident with a central axis of the multi-core optical fiber including the first marker element for all of the multi-core optical fibers, and wherein in the rotational alignment step, when each of the markers of the multi-core optical fibers includes the two second marker elements, each of the multi-core optical fibers is rotationally aligned around the longitudinal direction so that the central axis of the multi-core optical fiber including the two second marker elements is coincident with a midpoint of a line segment connecting centers of the two second marker elements for all of the multi-core optical fibers, or, so that distances from each of the two second marker elements to the central axis of the multi-core optical fiber including the two second marker elements are equal for all of the multi-core optical fibers.

4. The method for manufacturing a multi-core optical fiber connector according to claim 1, wherein each of the multi-core optical fibers comprises a reference marker extending along the longitudinal direction and arranged at a position different from that of the marker, on the second straight line in the cross section, wherein in the rotational alignment step, each of the markers in side faces of the multi-core optical fibers is monitored, wherein in the rotational alignment step, when each of the markers of the multi-core optical fibers includes the one first marker element, each of the multi-core optical fibers is rotationally aligned around the longitudinal direction so that the reference marker is coincident with the marker for all of the multi-core optical fibers, and wherein in the rotational alignment step, when each of the markers of the multi-core optical fibers includes the two second marker elements, each of the multi-core optical fibers is rotationally aligned around the longitudinal direction so that the reference marker is coincident with a midpoint of a line segment connecting centers of the two second marker elements for all of the multi-core optical fibers.

5. The method for manufacturing a multi-core optical fiber connector according to claim 4, wherein each of the multi-core optical fibers comprises a resin coat provided on an outer peripheral surface of the cladding, and wherein the ends of the multi-core optical fibers, from which the resin coat is removed in part, are arranged each on the installation face or respectively penetrate through the holes.

6. The method for manufacturing a multi-core optical fiber connector according to claim 1, wherein each of the multi-core optical fibers comprises a resin coat provided on an outer peripheral surface of the cladding, and wherein the ends of the multi-core optical fibers, from which the resin coat is removed in part, are arranged each on the installation face or respectively penetrate through the holes.

7. A method for manufacturing a multi-core optical fiber connector comprising: one or more multi-core optical fibers; and a connector having an installation face or holes formed in a row in a longitudinal direction of an end face of the connector, and a bottom face opposed to the installation face or the holes, ends of the multi-core optical fibers being held by the installation face or the holes, the method comprising:

an arrangement step of arranging each of the ends of the multi-core optical fibers at a predetermined position on the installation face or keeping the ends of the multi-core optical fibers respectively penetrate through the holes; and a rotational alignment step of rotating each of the multi-core optical fibers around a longitudinal direction of the multi-core optical fiber to adjust each of rotational positions of cross sections of the multi-core optical fibers, perpendicular to the longitudinal direction, wherein each of the multi-core optical fibers comprises; a plurality of cores extending along the longitudinal direction; a marker extending along the longitudinal direction while being separated from each of the plurality of cores; and a common cladding individually surrounding the plurality of cores and the marker, wherein in a cross section of each of the multi-core optical fibers, a core arrangement consisting of the plurality of cores includes one or more linear arrangement elements and each of the linear arrangement elements is comprised of two or more cores arranged on a first straight line or on a straight line parallel to the first straight line, wherein in the cross section of each of the multi-core optical fibers, the marker is arranged on a second straight line being perpendicular to the first straight line and passing a specific core out of the plurality of cores, and wherein in the rotational alignment step, each of the multi-core optical fibers is rotated around the longitudinal direction so as to locate the marker at a specific position, while monitoring the marker in the cross section, to align each of extending directions of the linear arrangement elements in the multi-core optical fibers with a specific direction so as to minimize each of a distance between the markers in adjacent multi-core optical fibers out of the multi-core optical fibers arranged on the installation face or penetrating through the holes, a distance between the specific cores in the adjacent multi-core optical fibers, and a distance between the linear arrangement elements in the adjacent multi-core optical fibers.

8. The method for manufacturing a multi-core optical fiber connector according to claim 7, wherein each of the multi-core optical fibers comprises a resin coat provided on an outer peripheral surface of the cladding, and wherein the ends of the multi-core optical fibers, from which the resin coat is removed in part, are arranged each on the installation face or respectively penetrate the holes.

9. A method for manufacturing a multi-core optical fiber connector comprising: one or more multi-core optical fibers; and a connector having an installation face or holes formed in a row in a longitudinal direction of an end face of the connector, and a bottom face opposed to the installation face or the holes, ends of the multi-cores optical fibers being held by the installation face or the holes, the method comprising:

an arrangement step of arranging each of the ends of the multi-core optical fibers at a predetermined position on the installation face or keeping the ends of the multi-core optical fibers respectively penetrate through the holes; and a rotational alignment step of rotating each of the multi-core optical fibers around a longitudinal direction of the multi-core optical fiber to adjust each of rotational positions of cross sections of the multi-core optical fibers, perpendicular to the longitudinal direction, wherein each of the multi-core optical fibers comprises; a plurality of cores extending along the longitudinal direction; a marker extending along the longitudinal direction while being separated from each of the plurality of cores; and a common cladding individually surrounding the plurality of cores and the marker, wherein in a cross section of each of the multi-core optical fibers, a core arrangement consisting of the plurality of cores includes one or more linear arrangement elements and each of the linear arrangement elements is comprised of two or more cores arranged on a first straight line or on a straight line parallel to the first straight line, wherein when a side face of each of the multi-core optical fibers is monitored along a direction perpendicular to the first straight line, the marker is arranged at a position where the marker is superimposed on a specific core included in the plurality of cores, in each of the multi-core optical fibers, and wherein in the rotational alignment step, each of the multi-core optical fibers is rotated around the longitudinal direction so as to make the marker and the specific core superimposed while monitoring the marker and the specific core from the side face, to align each of extending directions of the linear arrangement elements in the multi-core optical fibers with a specific direction.

10. The method for manufacturing a multi-core optical fiber connector according to claim 9, wherein in each of the multi-core optical fibers, a maximum width of the marker as monitored from the side face is not more than a maximum width of the specific core.

11. The method for manufacturing a multi-core optical fiber connector according to claim 9, wherein each of the multi-core optical fibers comprises a resin coat provided on an outer peripheral surface of the cladding, and wherein the ends of the multi-core optical fibers, from which the resin coat is removed in part, are arranged each on the installation face or respectively penetrate through the holes.

* * * * *